Patented Nov. 15, 1949

2,487,978

UNITED STATES PATENT OFFICE 2,487,978

CATALYTIC ISOMERIZATION OF OLEFINIC HYDROCARBONS

Maurice J. Murray, Clarendon Hills, Ill., assignor to Universal Oil Products Company, Chicago, Ill., a corporation of Delaware No Drawing. Application November 29, 1946, Serial No. 713,089

4 Claims. (Cl. 260—683.2)

This invention relates to hydrocarbon conversion reactions and to a particular type of novel catalyst for effecting such reactions. It is particularly concerned with the isomerization of olefins containing more than three carbon atoms using alumina impregnated with an alkaline earth halide as the catalyst.

In one embodiment my invention relates to a process for the conversion of hydrocarbons which comprises subjecting a convertible hydrocarbon at conversion conditions to the action of a catalyst comprising an active alumina impregnated with an alkaline earth halide.

In a more specific embodiment my invention relates to a process for isomerizing olefins which comprises subjecting an olefin containing more than three carbon atoms at isomerizing conditions to the action of a catalyst comprising an active alumina impregnated with an alkaline earth halide.

I have found that an active alumina impregnated with an alkaline earth halide is a catalyst for numerous hydrocarbon conversion reactions such as the alkylation of aromatic hydrocarbons and the polymerization of olefins. These catalysts are particularly useful in the isomerization of olefinic compounds, because, at suitable operating conditions, they effectively promote shifting of double bonds and migration of alkyl groups along the molecule, but exhibit little tendency to catalyze side reactions such as cracking and tar formation.

The aluminas which may be employed as the carriers or supports for my catalysts are active aluminas such as are formed, for example, by precipitation from a solution of an aluminum salt, followed by drying and calcining at a temperature within the range of 350 to 650° C. On the other hand, they may be selected from the naturally occurring active aluminas such as bauxite.

Some of the catalysts described herein may be prepared by treating an active alumina with an aqueous solution of an alkaline earth halide followed by drying to remove excess water. The chlorides, bromides, and iodides of calcium, barium, and strontium may be used as impregnants, but the chlorides and bromides are preferred because of their greater availability and because, in general, they tend to give somewhat better results than the other halides. The simplicity of the preparation and the low cost of the constituents make this type of catalyst especially attractive.

The alkaline earth fluorides are substantially insoluble in water. Therefore, the foregoing method of impregnation must be modified when an alkaline earth fluoride-alumina catalyst is to be prepared. One convenient method of preparation is to impregnate the alumina with a soluble alkaline earth salt followed by the addition of an aqueous solution of a soluble fluoride. The relatively insoluble alkaline earth fluoride then precipitates upon the alumina support. The resulting composite is then removed from the solution and dried.

The activity of these catalysts apparently is an unique property of the composite produced in the manner described, because alumina alone has only slight catalytic properties and the alkaline earth halides have even less. Similarly, physical mixtures of alumina and an alkaline earth halide, such as would be produced by intimately mixing the two constituents together in the dry state, have substantially no catalytic activity.

The catalyst may be in the form of beads, pellets, or granules suitable for use as a reactor filling material through which the reactants may be passed at conversion conditions of time, temperature, and pressure. Alternatively, the catalyst may be in a finely divided state such as a powder or microspheres and thus be adaptable for use in fluidized types of operations.

The isomerization processes in which my new catalysts are utilizable fall into two broad classes, namely, the isomerization of pure olefinic compounds and the isomerization of complex mixtures of olefinic compounds. The first of these includes isomerizations such as the conversion of 1-butene to 2-butene, alpha pinene to camphene, and 1-octene to a mixture of nonterminal straight-chain olefins, such as 2- and 3-octene, and tertiary type olefins such as 2-methyl-2-heptene. The second class includes the treatment of thermally cracked or reformed gasolines to improve the octane number thereof. This treatment is known as isoforming and is characterized by 96–99% yields of isomerized product together with very low losses to gas, coke and higher boiling hydrocarbons.

Olefinic hydrocarbons that may be isomerized in my process include all those containing more than three carbon atoms. However, normally liquid olefins are somewhat more readily isomerized than are the butenes. Branched chain normally liquid olefins such as 2-alkylalkenes are particularly susceptible to isomerization. The olefins charged in this process may be either of the open chain or of the cyclic variety.

When one of my catalysts is used to effect isoforming, the charge stock comprises a thermally cracked or reformed gasoline, by which I means the gasoline produced by the thermal cracking of hydrocarbons with boiling points above the gasoline range and the gasoline produced by the thermal reforming of straight run gasolines and naphthas. Isoforming can also be applied to catalytically cracked or catalytically reformed gasoline. It is particularly effective for treating gasoline which is obtained by thermally cracking the gas oil obtained from a catalytic cracking process. Because certain portions of thermally cracked gasoline respond differently to isoforming, it sometimes is advantageous to separate the gasoline into one or more fractions and process them under optimum conditions for each fraction. For the same reason it sometimes is advantageous to recycle a portion of the product to the isoforming step.

The process of this invention may be carried out in batch operation by placing a quantity of the catalyst in the reactor equipped with a stirring device, adding the hydrocarbon reactants, heating to a reaction temperature, maintaining the contents of the reactor at the reaction temperature for a suitable period of time, cooling the reaction mixture, and recovering the product. However, the preferred method of operation is of the continuous type. In one mode of continuous operation, the catalyst particles are placed in a reactor and the heated reactants are passed therethrough at suitable operating conditions. If the catalyst is in the finely divided state, it may be placed in a reactor and the charge passed upwardly therethrough causing the catalyst particles to become motionalized and forming a fluid-like mass. Another alternative method of continuous operation comprises suspending the catalyst in a stream of charge and treating said suspension under suitable conditions of temperature and pressure to produce the desired conversion reaction.

The operating conditions employed in this process are dependent to some extent upon the type of reaction desired and upon the particular alkaline earth halide with which the alumina is impregnated. In general, however, it will be found that the optimum temperature for most reactions will lie within the range of 200–1100° F. The time of contact will vary from a few minutes to several hours. Pressures may range from approximately atmospheric to about 100 atmospheres.

The following examples are given to illustrate my invention, but they are not introduced with the intention of unduly limiting the generally broad scope of said invention.

*Example I*

125 ml. of ⅛ inch activated alumina pellets were immersed in a 20% aqueous calcium chloride solution. After ½ hour the excess solution was drained off and the catalyst was dried at 100° C. The catalyst prepared in accordance with the procedure outlined above was placed in a vertical tube furnace and heated to 400° C., at which temperature 25 ml. of 1-octene was passed over the catalyst at a liquid hourly space velocity of 1.0 and atmospheric pressure. The effluent from the furnace was caught in a trap cooled in ice water. The infrared spectrum of the product showed less than 5% of 1-octene, large amounts of nonterminal straight chain octenes, and a considerable amount of tertiary type octenes such as

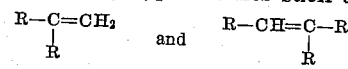

where R represents an alkyl group.

*Example II*

The experiment described under Example I was repeated using unimpregnated alumina. The infrared spectrum of the product showed the presence of more than 50% of 1-octene, some 2-, 3-, and 4-octenes, and substantially no branched chain or tertiary octenes.

A comparison of the results given under Examples I and II shows that alumina impregnated with calcium chloride has a much greater activity for the isomerization of 1-octene than has alumina alone. Further the impregnated alumina induced skeletal isomerization whereas alumina alone did not.

*Example III*

Octene-1 was passed over granular calcium chloride at atmospheric pressure, a temperature of 400° C., and a liquid hourly space velocity of 1.0. Analysis of the effluent showed that no isomerization had taken place.

*Example IV*

The $C_7$ (70–100° C.) fraction of a Bareco thermally cracked gasoline was passed over a portion of calcium chloride-alumina catalyst, prepared in the manner described under Example I, at 400° C., a liquid hourly space velocity of 1 and atmospheric pressure. Analysis of the product showed that substantially complete isomerization of the 1-heptene had occurred.

I claim as my invention:

1. A method of increasing the octane number of thermally cracked gasoline which comprises contacting a thermally cracked gasoline at isomerizing conditions with a catalyst consisting essentially of alumina impregnated with a substantial amount of an alkaline earth halide and recovering the isomerized product.

2. A method of increasing the octane number of thermally cracked gasoline which comprises contacting a thermally cracked gasoline at isomerizing conditions with a catalyst consisting essentially of alumina impregnated with a substantial amount of a calcium halide and recovering the isomerized product.

3. The process of claim 2 further characterized in that the calcium halide is calcium chloride.

4. The process of claim 2 further characterized in that the calcium halide is calcium bromide.

MAURICE J. MURRAY.

REFERENCES CITED

The following references are of record in the file of this patent:

UNITED STATES PATENTS

| Number | Name | Date |
|---|---|---|
| 1,590,640 | Mii et al. | June 29, 1926 |
| 1,638,644 | Schlosstein | Aug. 9, 1927 |
| 2,126,284 | Rose | Aug. 9, 1938 |
| 2,395,274 | Hillyer et al. | Feb. 19, 1946 |
| 2,403,279 | Hewlett | July 2, 1946 |

OTHER REFERENCES

Berkman et al., "Catalysis," Reinhold Publishing Corp. 1940 (pages 693, 694, 700, 843).

Matignon et al., "Bull. Soc. Chim. France," Vol. 2, 5th ser. part 2, pages 1169 to 1188.

Searle, "Chemistry and Physics of Clays," 2nd Ed., 1933, Ernest Benn Ltd., pages 454 to 456.